(12) United States Patent
Muhonen

(10) Patent No.: US 9,982,407 B2
(45) Date of Patent: May 29, 2018

(54) METHOD AND A SYSTEM FOR REMOVAL OF OIL UNDER ICE

(71) Applicant: LAMOR CORPORATION AB, Porvoo (FI)

(72) Inventor: Juha Muhonen, Helsinki (FI)

(73) Assignee: Lamor Corporation AB, Porvoo (FI)

( * ) Notice: Subject to any disclaimer, the term of this patent is extended or adjusted under 35 U.S.C. 154(b) by 8 days.

(21) Appl. No.: 14/910,535

(22) PCT Filed: Aug. 5, 2014

(86) PCT No.: PCT/FI2014/050607
§ 371 (c)(1),
(2) Date: Feb. 5, 2016

(87) PCT Pub. No.: WO2015/018977
PCT Pub. Date: Feb. 12, 2015

(65) Prior Publication Data
US 2016/0186399 A1    Jun. 30, 2016

(30) Foreign Application Priority Data

Aug. 6, 2013  (FI) ..................................... 20135816

(51) Int. Cl.
*E02B 15/02* (2006.01)
*E02B 15/08* (2006.01)
*E02B 15/10* (2006.01)

(52) U.S. Cl.
CPC .......... *E02B 15/0835* (2013.01); *E02B 15/02* (2013.01); *E02B 15/08* (2013.01); *E02B 15/10* (2013.01); *E02B 15/107* (2013.01)

(58) Field of Classification Search
CPC .......... E02B 15/02; E02B 15/08; E02B 15/10; E02B 15/106
(Continued)

(56) References Cited

U.S. PATENT DOCUMENTS 3,907,463 A * 9/1975 Eller ...................... F04B 47/08
                                                        417/360
4,039,454 A * 8/1977 Miller ................... E02B 15/103
                                                        210/242.3
(Continued)

FOREIGN PATENT DOCUMENTS

CN          2275800 Y     3/1998
CN        101842283 A     9/2010
(Continued)

OTHER PUBLICATIONS

International Search Report and Written Opinion for Application No. PCT/FI2014/050607 dated Sep. 16, 2014.
(Continued)

*Primary Examiner* — Christopher Upton
(74) *Attorney, Agent, or Firm* — Alston & Bird LLP

(57) ABSTRACT

Provided is a method and a system for removal of oil under ice through an opening made into ice. The system includes oil booms extending under ice in two different directions from the opening so as to constitute an angle of less than 180 degrees between each other; an oil collection device placed in the opening; and a propulsion device placed on the level of the lower surface of ice at a distance from the opening in the area of the angle so as to provide a flow directed towards the opening between the oil booms in the area of the angle.

3 Claims, 1 Drawing Sheet

(58) Field of Classification Search
USPC ........ 210/747.5, 747.6, 776, 170.05, 179.09, 210/170.11, 242.3, 923
See application file for complete search history.

(56) References Cited

U.S. PATENT DOCUMENTS

| | | | |
|---|---|---|---|
| 4,388,188 A | | 6/1983 | Morris |
| 4,391,707 A | | 7/1983 | Gordon |
| 4,431,339 A | | 2/1984 | Bickham |
| 5,045,216 A | * | 9/1991 | Eller ............... E02B 15/046 210/242.3 |
| 5,122,283 A | | 6/1992 | Wells |
| 5,556,538 A | * | 9/1996 | Beard ............... C02F 1/006 210/194 |
| 6,592,765 B1 | * | 7/2003 | Mykkanen ......... E02B 15/045 210/170.05 |
| 7,182,860 B2 | * | 2/2007 | Lundin ............ E02B 15/106 210/242.3 |
| 8,025,460 B2 | * | 9/2011 | Cobb ................ E02B 15/08 405/61 |
| 8,343,358 B2 | * | 1/2013 | Immonen ........... B63B 35/32 210/170.05 |
| 2010/0252508 A1 | | 10/2010 | Immonen |
| 2014/0319076 A1 | * | 10/2014 | Galushko ........... B63G 8/001 210/747.6 |

FOREIGN PATENT DOCUMENTS

| | | |
|---|---|---|
| RU | 2279508 C2 | 7/2006 |
| RU | 2370593 C1 | 10/2009 |
| SU | 983183 A1 | 12/1982 |
| WO | WO 2008/040839 A1 | 4/2008 |
| WO | WO 2008/099054 A1 | 8/2008 |
| WO | WO 2010/084247 A1 | 7/2010 |

OTHER PUBLICATIONS

Office Action for Chinese Application No. 201480040035.6 dated Feb. 15, 2017.
Office Action for Chinese Application No. 201480040035.6 dated Jul. 27, 2017, 12 pages total.
Search Report and Acceptance Decision for Russian Application No. 2016104625/13 dated Mar. 26, 2018, 10 pages.

* cited by examiner

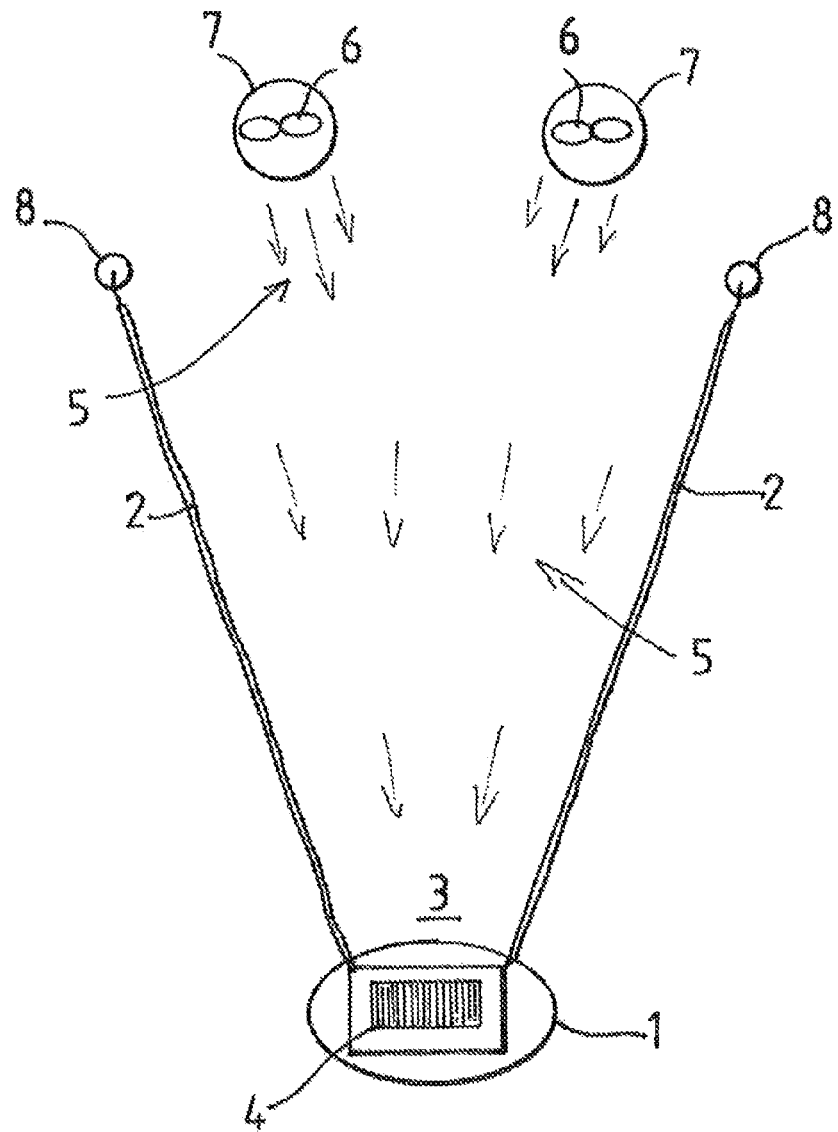

METHOD AND A SYSTEM FOR REMOVAL OF OIL UNDER ICE

FIELD

The invention relates to a method and a system for removal of oil and other impurities floating in, i.e. lighter than, water under ice through an opening made into ice.

BACKGROUND

Removal of oil from the surface of water by oil booms and skimmers provided with rotating brushes is an advanced and functional technique. In addition, particularly in limited areas, such as basins, oil is effectively collected by the so-called rope mop technique. The rope mop is a long endless rope which is made into a soft and thick weave, a hairy yarn structure or an equivalent airy assembly floating in water. It can be circulated through appropriate deflection wheels provided on the surface of water and raised onto a drive wheel so as to be squeezed clean before being conveyed back into water. This way, the rope mop absorbs impurities from the surface of water. Its yarn structure and thereby the absorbency may vary according to the quality of the impurity being currently collected. In addition, devices have been developed for recovery of oil among ice, at least to a certain extent. However, in accidents occurring in winter, oil often migrates under the solid ice, in which case the known oil collection techniques are not working.

SUMMARY

The objective of the invention is to disclose a novel method and a system specifically suited for removal of oil and equivalent impurities from the lower surface of solid ice.

The method and the system according to the invention are designed for removal of oil and equivalent floating impurities from the lower surface of solid ice both in the sea and lakes as well as closed basin areas through an opening made into ice.

In the method according to the invention the oil under solid and uniform ice is removed by first making an opening into ice. Then, two oil booms are taken under ice through the opening to be pressed against the lower surface of ice. The oil booms are straightened to extend in two different directions from the opening in such a way as jointly to constitute an angle of less than 180 degrees. In practice, the appropriate size of the angle is of the order of approximately 90 degrees. Then, an appropriate oil collection device, such as a skimmer, is placed in the opening. In addition, simple flow separators and suction machines may be applicable in particular when large quantities of oil to be collected are present. Finally in the method, a flow directed towards the opening is provided on the lower surface of ice in the area of said angle constituted by the oil booms for transferring oil on the lower surface of ice towards the opening and the oil collection device by the guidance of the booms to recover the oil.

In the invention, the flow directed towards the opening is provided by introducing a propulsion device under ice from a second opening made into ice. This second opening is appropriately made in the area of the angle sufficiently far from the vertex of the angle, i.e. the first opening. It may even be farther than the oil booms. In addition, several propulsion devices may be placed in the area or in front of the angle.

The system according to the invention for removal of oil under ice through an opening made into ice includes oil booms extending under ice in two different directions from said opening and constituting between each other an angle of less than 180 degrees. Further, the system includes an oil collection device placed in the opening and a propulsion device placed substantially on the level of the lower surface of ice at a distance from the opening in the area of said angle for providing a flow directed towards the opening between the oil booms in the area of the angle. The propulsion devices in the area of the angle may be present between the oil booms or farther in front of the open angle. The essential feature is to provide a sufficient flow towards the vertex of the angle constituted by the oil booms.

The propulsion device, of which there may be one or several, may be a rotatable propeller which is placed under ice through a second opening made into ice. In addition, a water or air jet aimed at the right direction under ice can be used.

In the method and the system according to the invention the oil boom can be floated from the opening into water under ice by different methods known per se. It is possible to use self-opening oil booms or rigid oil booms joined at the extremities to each other using a cable to have the desired V-angle. In addition, it is possible first to float ropes under ice and then pull the booms into the V-angle by the ropes and bind them in place.

The functioning of the method and the system according to the invention is based on the observation that in general the conditions under ice are relatively steady and calm. Thus, the oil flows are not able to escape under windless and waveless conditions; instead, the layer of oil against the lower surface of ice can be moved in the desired direction even by the use of lesser flows and guiding booms.

Advantages

The device according to the invention has considerable advantages compared with the prior art.

The method and the system according to the invention are simple and easy to use. Using the invention does not necessarily require new or special equipment. The oil booms used may be any booms able to be pressed sufficiently tightly to the lower surface of ice. The collector in the opening at the vertex of the angle may be any device pumping or separating oil sufficiently effectively. Further, a suitable propulsion device may be almost any device for making water move. A simple and suitable example is an outboard motor placed in the opening made into ice in such a way as to have its propeller on the level of the lower surface of ice. Another easy solution is a water pump on top of the ice, with the exhaust pipe thereof directed through the opening in ice towards the angle constituted by the booms.

BRIEF DESCRIPTION OF THE DRAWINGS

The accompanying drawing, which is included to provide a further understanding of the invention and constitutes a part of this specification, illustrates schematically an embodiment of the invention and together with the description helps to explain the principles of the invention.

DETAILED DESCRIPTION

In the system and the method according to the FIGURE, when oil is present under ice and should be removed, an opening 1 is first made into ice. Two oil booms 2 are conveyed under ice through the opening 1 in such a way as to extend from this opening 1 and project in different directions in such a way that they constitute an angle 3 between each other. The angle must be smaller than 180 degrees. Most appropriately, it is of the order of 90 degrees, possibly 50-100 degrees, depending on the extent of the area being cleaned and the length of the oil booms being used.

A good way of opening the oil booms straight under ice is first to float ropes in two directions from the opening 1 and pull them up at a sufficient distance from small openings 8. The applicable floating devices are common for example among fishermen engaging in net fishing in winter. Finally, the ropes can be used to pull the oil booms in place and at an angle relative to each other and lock them in place between the opening 1 and the small openings 8.

Next, an oil collection device 4 that may be a skimmer based on the rotating brush technique or any other device appropriate for separation and recovery of oil is installed in the opening 1.

Then, at least one further opening 7 is made in the area of the open angle 3, for example approximately between the ends of the oil booms or even farther. A propulsion device 6 is placed in this opening 7. It may be an outboard motor used in boats, a water or air pump or other device for providing a flow in the desired direction under ice. It should be noted that the flow need not be very strong. Under ice, the conditions are in general quite steady, so that even a small extra flow will make the layer of oil move in the desired direction.

Thus, in the method and the system according to the invention the oil collection device 4 at the vertex of the angle 3 recovers oil flowing into the opening 1, generating slight suction at the angle. At the same time, the propulsion devices 6 push oil towards the vertex of the angle 3 by an under-ice flow 5. Thus, the oil is moved by their joint effect towards the collector 4 and separation from water in the entire area of the angle.

In the invention it is also possible to place the propulsion devices in such vicinity to the sides of the angle 3, i.e. the oil booms 2, that pulling and locking of the oil booms can be made in the same openings 7 through which the propulsion devices 6 are placed in the area of the angle 3.

It is obvious to a person skilled in the art that with the advancement of technology, the basic idea of the invention may be implemented in various ways. The invention and its embodiments are thus not limited to the example described above; instead they may vary within the scope of the claims.

The invention claimed is:

1. A method for removal of oil under ice through an opening made into ice, wherein an opening is made into ice, two oil booms able to be pressed against the lower surface of ice are provided under ice so as to extend in different directions from the opening, jointly constituting an angle of less than 180 degrees, an oil collection device is provided in the opening and a flow directed towards the opening is provided by introducing a propulsion device under ice from a second opening made into ice on the lower surface of ice in the area of said angle so as to transfer the oil on the lower surface of ice towards the opening and the oil collection device by the guidance of the booms to recover the oil, wherein the propulsion device includes a rotatable propeller configured to be placed under ice through the second opening made into ice, and wherein the two oil booms are positioned at a distance from the oil collection device, and the second opening is positioned at at least the same distance from the oil collection device as the two oil booms and within the angle between the two oil booms.

2. A system for removal of oil under ice through an opening made into ice, wherein the system includes oil booms configured to extend under ice in two different directions from said opening so as to constitute an angle of less than 180 degrees between each other; an oil collection device configured to be placed in the opening; and a propulsion device configured to be placed on the level of the lower surface of ice at a distance from the opening in the area of said angle so as to provide a flow directed towards the opening between the oil booms in the area of the angle, wherein the propulsion device includes a rotatable propeller configured to be placed under ice through a second opening made into ice, and wherein the two oil booms are positioned at a distance from the oil collection device, and the second opening is positioned at at least the same distance from the oil collection device as the two oil booms and within the angle between the two oil booms.

3. The system according to claim 2, wherein the system includes at least two propulsion devices placed in the area of said angle at a distance from each other.

* * * * *